(12) United States Patent
Chang (10) Patent No.: US 7,240,457 B1
(45) Date of Patent: Jul. 10, 2007

(54) FLUID SUPPLYIER ADAPTED TO POTTED PLANTS

(76) Inventor: Tien-Tsai Chang, No. 18, Lane 1281, Chung Cheng Road, Wu Fong Hsiang, Taichung Hsien (TW)

( * ) Notice: Subject to any disclaimer, the term of this patent is extended or adjusted under 35 U.S.C. 154(b) by 0 days.

(21) Appl. No.: 11/371,648

(22) Filed: Mar. 9, 2006

(51) Int. Cl.
*A01G 29/00* (2006.01)
(52) U.S. Cl. ......................................... 47/48.5; 47/40.5
(58) Field of Classification Search ................ 47/48.5, 47/40.5
See application file for complete search history.

(56) References Cited

U.S. PATENT DOCUMENTS

| | | | | |
|---|---|---|---|---|
| 6,219,963 B1 * | 4/2001 | Wang | .......................... | 47/48.5 |
| 6,243,986 B1 * | 6/2001 | Crowley | ..................... | 47/48.5 |
| 6,684,563 B2 * | 2/2004 | Wu | ............................. | 47/48.5 |

* cited by examiner

*Primary Examiner*—Peter M. Poon
*Assistant Examiner*—Willie Berry, Jr.
(74) *Attorney, Agent, or Firm*—Pro-Techtor Int'l Services (57) ABSTRACT

The present invention relates to a fluid supplier adapted to potted plants, which comprises an insertion pillar having a drainage aperture used to support a container, a seat disposed at the top of insertion pillar, a pad having a central hole and a guide chute mounted at the seat, wherein the central hole of the pad is in communication with the guide chute and the drainage aperture of insertion pillar, respectively. Furthermore, a rotatable adjustment member is fastened to the seat and at a predetermined position therein in response to the guide chute is formed a gently shrunk water passage, further, the container having an air inlet therebottom is assembled with the adjustment member such that air can flow into the air inlet of container so as to rotate the adjustment member to determine a specific width of water passage corresponding to the guide chute, thus enabling easily to control the amount of water for the fluid supplier adapted to potted plants.

2 Claims, 10 Drawing Sheets

FLUID SUPPLYIER ADAPTED TO POTTED PLANTS

BACKGROUND OF THE INVENTION

1. Field of the Invention

The present invention relates to a fluid supplier adapted to potted plants that can easily control the amount of water thereof.

2. Description of the Prior Arts

Figure 1:
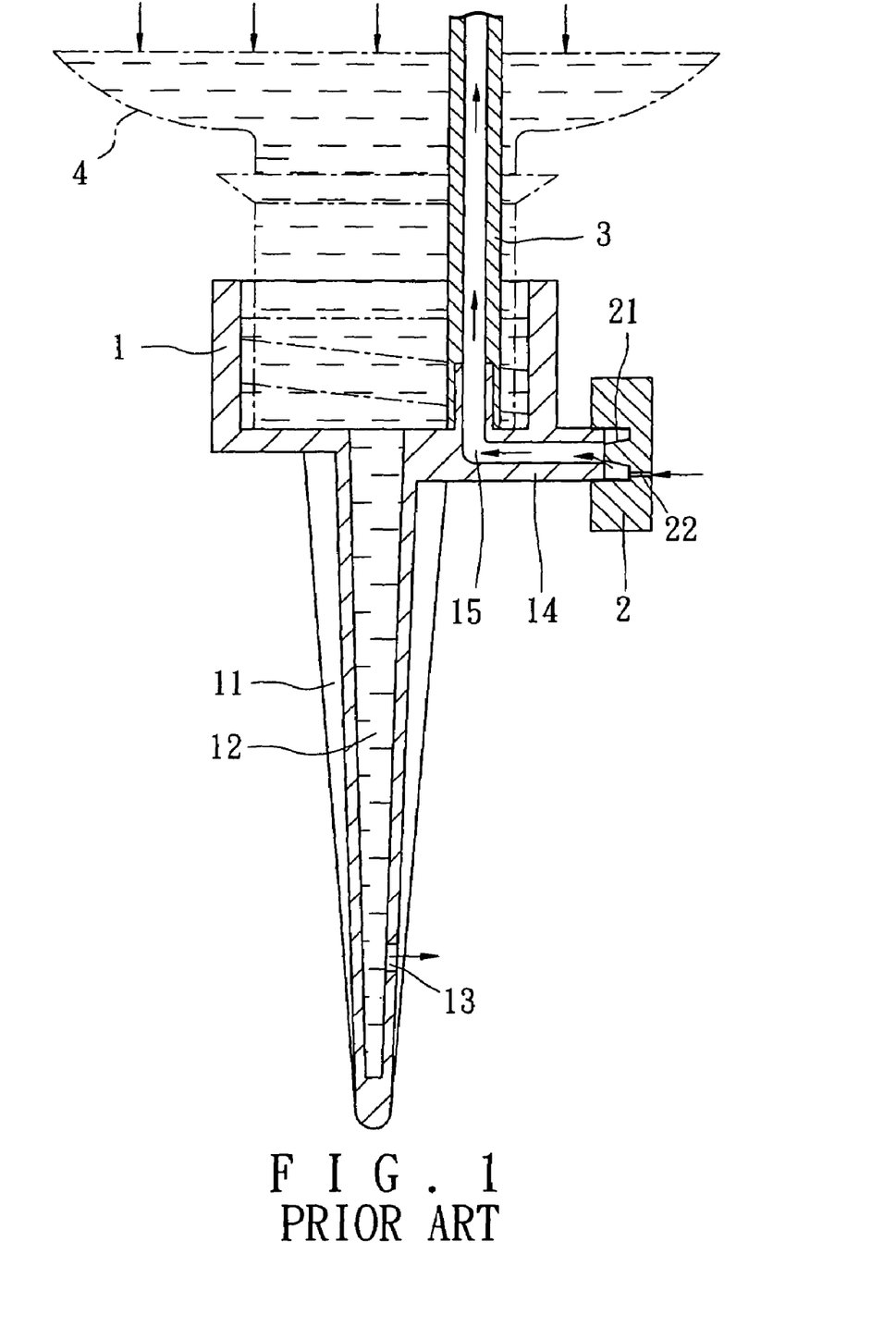
FIG. 1 is an operational view of a water supplier of Taiwan Pat. No. 90218894.

Currently, a variety of potted plants are wildly planted by people, however, people may water the plants with excessive water amount, thus causing the rotten roots of plants. On the other hands, some people may be too busy to water their plants regularly, so resulting in faded plants. To improve such problems, some manufacturers have developed an automatic fluid supplier, such as water fluids or medicinal fluids and the like. As shown in FIG. 1, the Taiwan Pat. No. 90218894, entitled "Water Supplier" discloses that a casing 1 is provided at the bottom thereof with a conical pillar 11 having a channel 12 and a water outlet 13. At the side of casing 1 is formed an intake tube 14 having an air passage 15 therein, wherein the air passage 15 is in communication with the interior of casing 1 and projects out of said casing 1, and the projected end of passage 15 matingly screws with a control knob 2, an conical controlling block 21 is mounted at a predetermined position of control knob 2 in response to the air passage 15 of intake tube 14, and at one side of control knob 2 is arranged an air inlet 22 in communication with the controlling block 21, in addition, at the side of intake tube 14 proximate to the interior of casing 1 is fittingly fixed an outtake tube 3 which inserts through a container 4 capable of being screwingly held by the casing 1. The conical pillar 11 of casing 1 can be inserted into the soil of plant, and then rotating the control knob 2, the controlling block 21 can be urged to insert into the air passage 15 of intake tube 14 in such a manner that the air inflowing amount from the air inlet 22 can be properly controlled, thereafter, said air will further flow into the container 4 through the outtake tube 3 so that the water fluid can flow into the soil through the channel 12 of conical pillar 11 and the water outlet 13 by using the pressure of air. Nevertheless, such a water supplier is to apply a method of air inflow adjustment to generate different pressures so as to control the water flowing amount. When the user adjusts the amount of water at the beginning, he will rotate the control knob based on the fluid amount and the storage space of air, the controlling block will accordingly insert into a specific depth of air passage to urge the pressure of air-admitting amount to downwardly press the fluids such that the water outflowing amount will be achieved. Unfortunately, the fluids in the container will gradually decrease and the storage space of air will relatively increase, hence, if the set air inflowing amount is unchangeable, it will cause the reduction of pressure due to the increasing storage space of air. In such a situation, the water outflowing amount will not be contained in a specific range because lacking of sufficient air pressure.

The present invention has arisen to mitigate and/or obviate the afore-described disadvantages.

SUMMARY OF THE INVENTION

The primary objective of the present invention is to provide a fluid supplier adapted to potted plants, which comprises an insertion pillar having a drainage aperture used to support a container, a seat disposed at the top of insertion pillar, a pad having a central hole and a guide chute mounted at the seat, wherein the central hole of pad is in communication with the guide chute and the drainage aperture of insertion pillar, respectively. Furthermore, a rotatable adjustment member is fastened to the seat and at a predetermined position therein in response to the guide chute is formed a gently shrunk water passage, further, the container having an air inlet therebottom is assembled with said adjustment member such that air can flow into the air inlet of container so as to rotate the adjustment member to determine a specific width of water passage corresponding to the guide chute, thereby enabling easily to control the amount of water for the fluid supplier adapted to potted plants.

The secondary objective of the present invention is to provide a fluid supplier adapted to potted plants, which can utilize the rotation of adjustment member to determine a specific width of water passage corresponding to the guide chute of pad, thus enabling to control the water outflowing amount in such a manner that the fluid amount can be stably supplied.

The present invention will become more obvious from the following description when taken in connection with the accompanying drawings, which show, for purpose of illustrations only, the preferred embodiment in accordance with the present invention.

BRIEF DESCRIPTION OF THE DRAWINGS

FIG. 5-1 shows the fluid supplier of the present invention being adjusted to supply more water fluids;

FIG. 5-2 is a top plan view of a part of FIG. 5-1;

FIG. 6-1 shows the fluid supplier of the present invention being adjusted to supply less water fluids;

FIG. 6-2 is a top plan view of a part of FIG. 6-1;

FIG. 7-1 shows the fluid supplier of the present invention stopping the supply of water fluids;

FIG. 7-2 is a top plan view of a part of FIG. 7-1.

DETAILED DESCRIPTION OF THE PREFERRED EMBODIMENT

Figure 2:
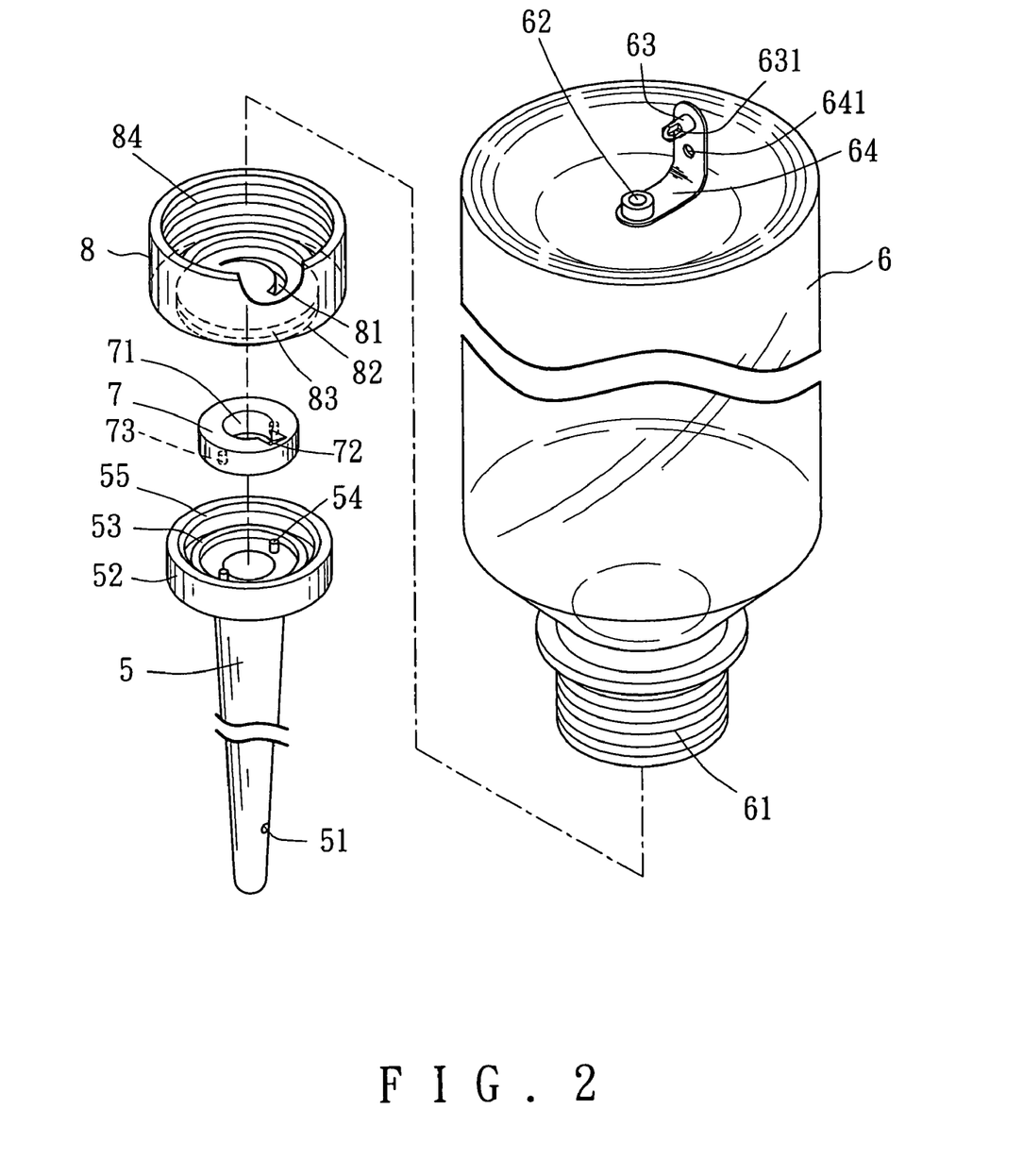
FIG. 2 is an exploded view of a fluid supplier adapted to potted plants in accordance with the present invention.
Figure 3:
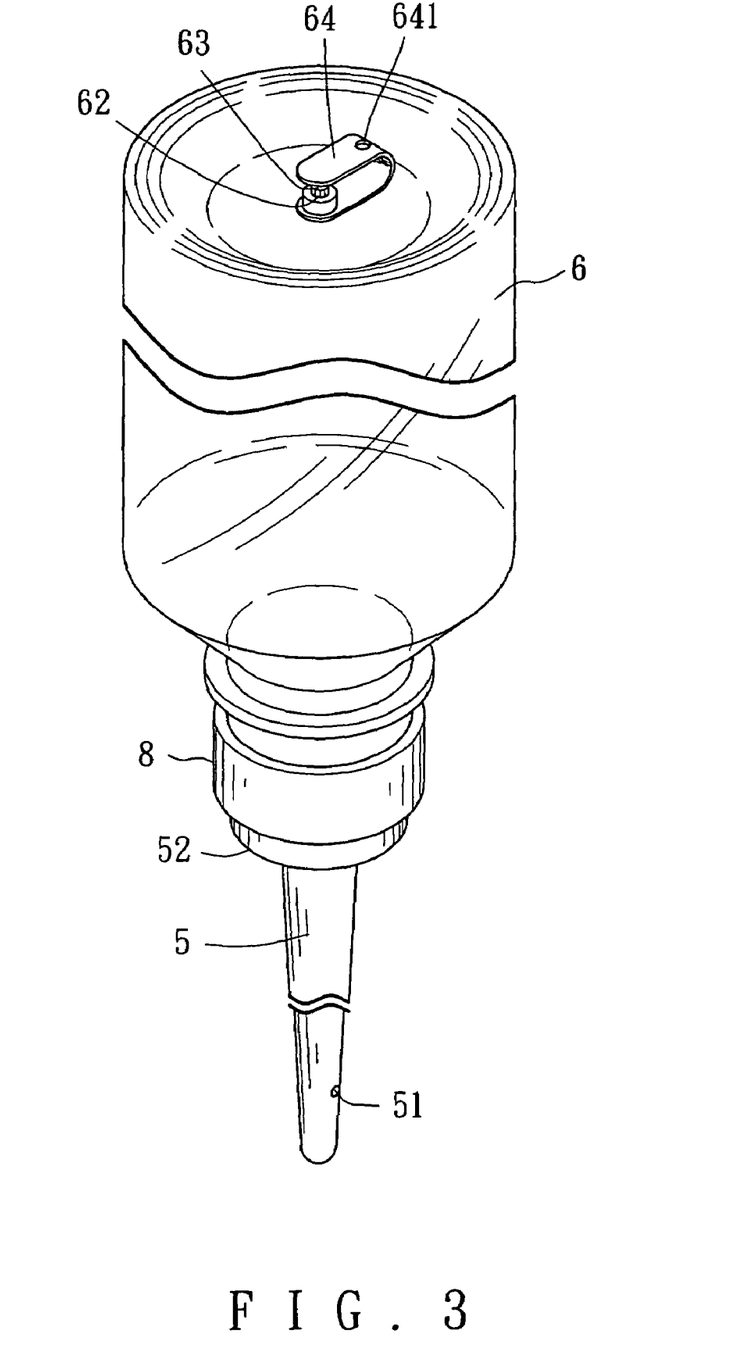
FIG. 3 is an assembly view of the fluid supplier adapted to potted plants in accordance with the present invention.
Figure 4:
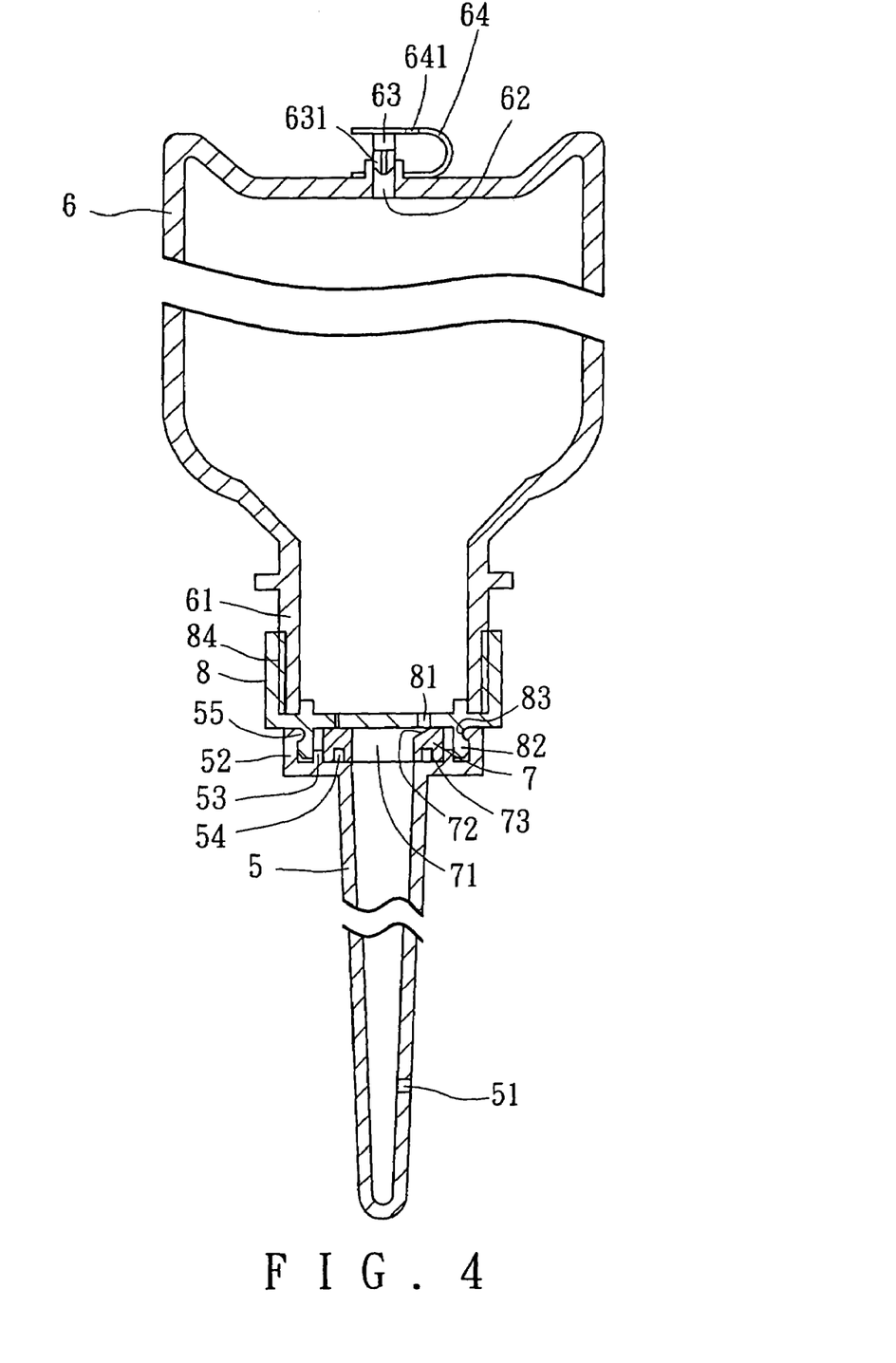
FIG. 4 is a cross sectional view of the fluid supplier adapted to potted plants in accordance with the present invention.

Referring to FIGS. 2–4, a fluid supplier adapted to potted plants in accordance with the present invention is shown and comprises a insertion pillar 5 for the support of a container 6, wherein one embodiment of the insertion pillar 5 is in the shape of a hollow rod having a closed end, and at least one drainage aperture 51 is formed in said insertion pillar 5, also, at the top of insertion pillar 5 is provided with a seat 52 having a locating ring 53 therein for receiving a pad 7. Furthermore, a central hole 71 communicating with the hollow opening of insertion pillar 5 is formed through the pad 7, and with a guide chute 72 is defined at the periphery of the central hole 71, between the bottom of pad 7 and the seat 52 of insertion pillar 5 is disposed a positioning structure which consists of at least one locating peg 54 mounted on the seat 52 and a positioning bore 73 in response to said at least one locating peg 54 arranged in the pad 7 such that the pad 7 can locate onto the seat 52 and be confined within the locating ring 53, thereafter, on the seat 52 of insertion pillar 5 is fixed an adjustment member 8 in which a gently shrunk water passage 81 corresponding to the guide chute 72 of pad 7 is mounted therein, and a protruded solid cylinder 82 is disposed at the bottom of adjustment member 8. Between the adjustment member 8 and the seat 52 is provided with a connection structure which comprises a projected fastening ridge 55 arranged at the inner periphery of seat 52 and a concaved locking groove 83 in response to said fastening ridge 55 defined at the protruded tube 82 so that the adjustment member 8 can matingly engage with the fastening ridge 55 of insertion pillar 5 and can rotate on the seat 52. At another end of adjustment member 8 is internally provided with a threaded connection portion 84 for screwing with an opening portion 61 of container 6, and at the bottom of container 6 is fixed an air inlet 62, by using a coupling piece 64 having a hole 641 thereon, a conical plug 63 provided with a plurality of recesses 631 can be located therein.

Figure 51:
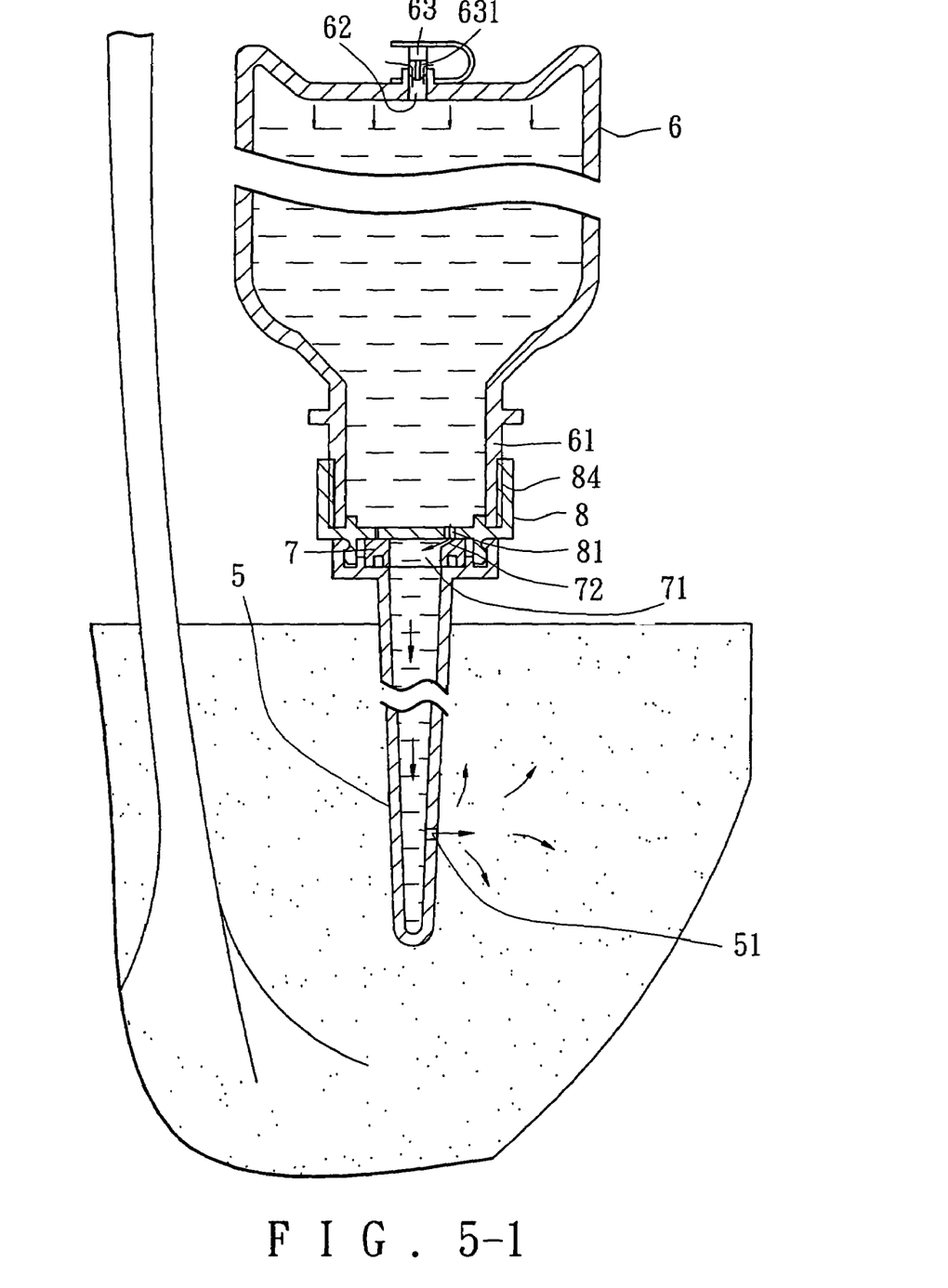
Figure 52:
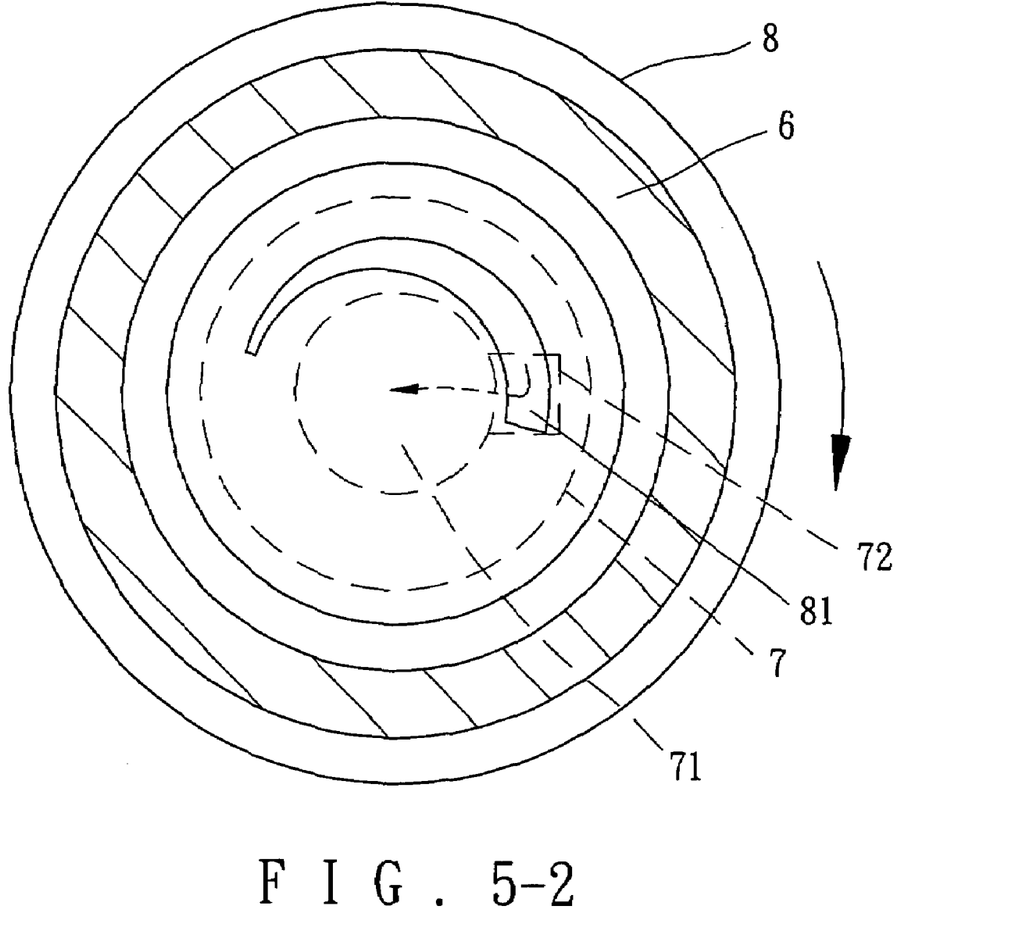

Referring to FIGS. 5-1 and 5-2, the container 6 can store water fluids therein and the opening portion 61 thereof can screw with the connection portion 84 of adjustment member 8. In addition, when inserting the insertion pillar 5 into the soil of potted plant, the container 6 will be supported upside down, and the air inlet 62 as well as the plug 63 will face upwardly so that the front end of plug 63 can appropriately insert into the air inlet 62 in such a manner that the air can flow into the container 6 through the respective air recesses 631 of plug 63, thus the air pressure of the interior of container 6 is equal to that of the exterior of the container 6, so that the water will flow downwardly. While the user is desired to supply more water fluids, he can rotate the adjustment member 8, hence, the widest portion of water passage 81 will correspond to the guide chute 72 of pad 7, and the flat surface of pad 7 will close the other gently shrunk portion of water passage 81 such that said more water fluids will flow into the guide chute 72 through the widest portion of water passage 81, and then further flow to the insertion pillar 5 through central hole 71, finally flow into the soil through drainage aperture 51 of insertion pillar 5, thereby attaining a stable supply of water fluids of supplier.

Figure 61:
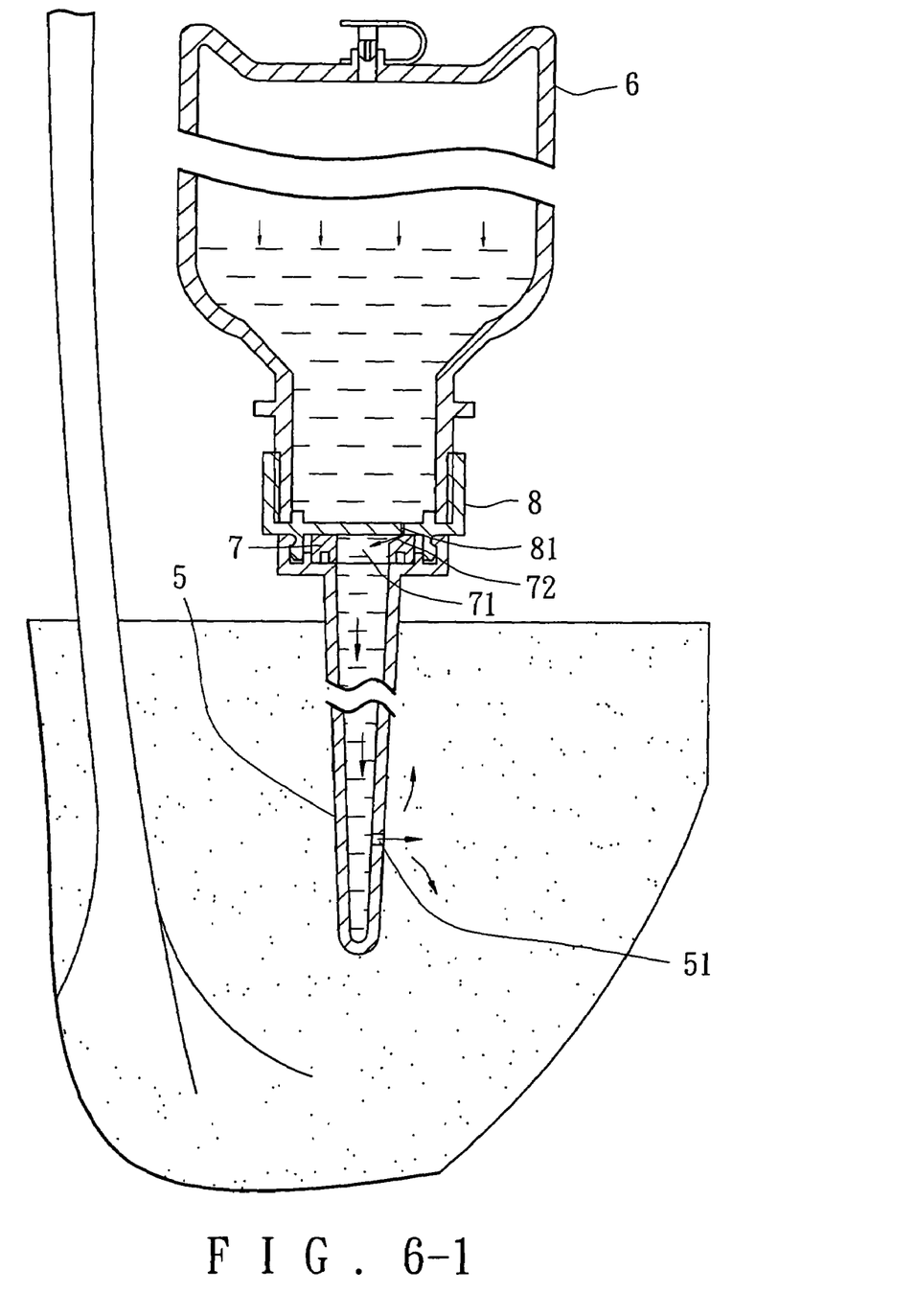
Figure 62:
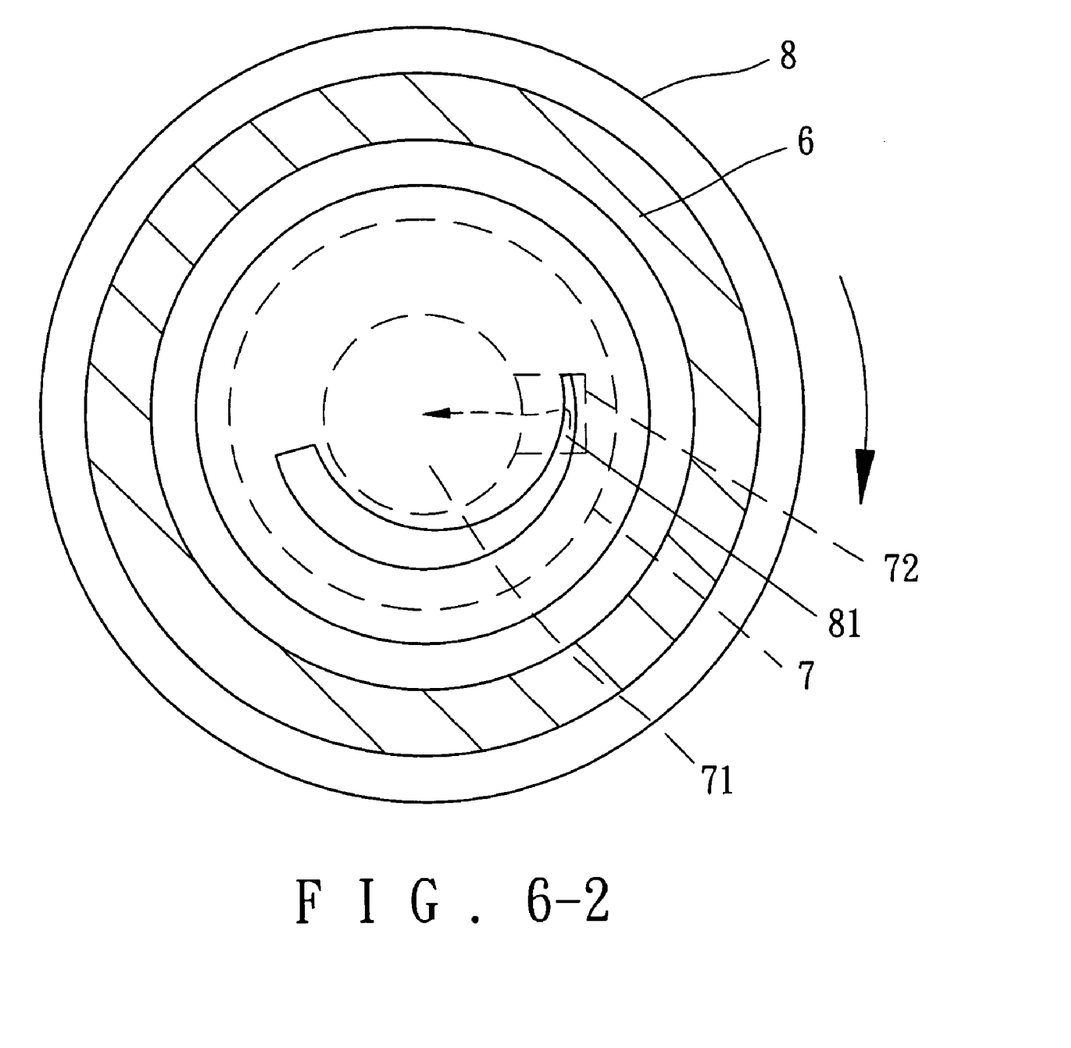

Referring further to FIGS. 61- and 6-2, because the air pressures of the interior and the exterior of container 6 are the same, when the user intends to supply less water fluids to the potted plant, he can also rotate the adjustment member 8 so that the narrowest portion of water passage 81 will correspond to the guide chute 72 of pad 7, and the flat surface of pad 7 will close the other portion of water passage 81 in such a manner that the less water fluids will flow into the guide chute 72 through the narrowest portion of water passage 81, and then further flow to the insertion pillar 5 through central hole 71, finally flow into the soil through drainage aperture 51 of insertion pillar 5, thereby attaining a stable supply of water fluids of supplier as well.

Figure 71:
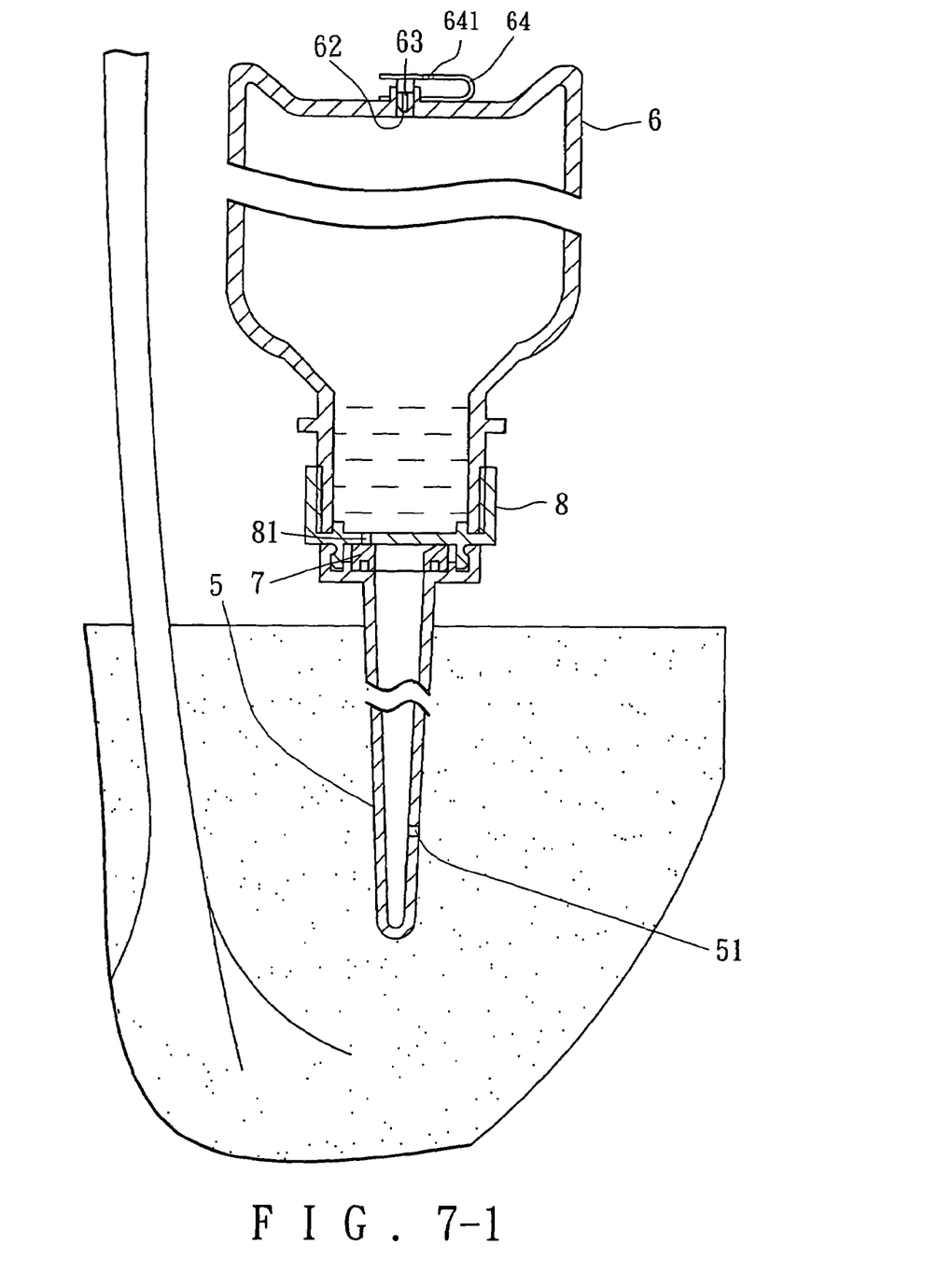
Figure 72:
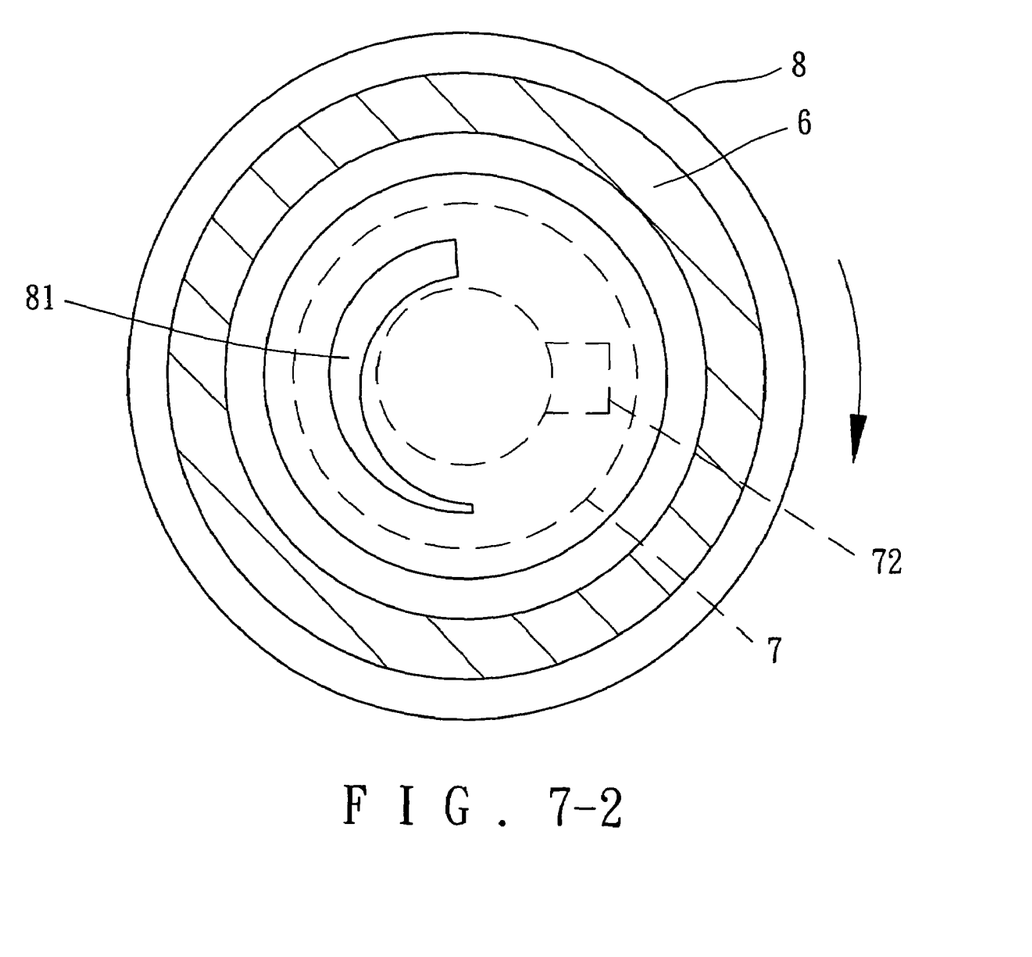

As shown in FIGS. 2, 7-1 and 7-2, if the user wants to stop the supply of water fluids, he can also rotate the adjustment member 8 so that the entire water passage 81 will separate from the guide chute 72 of pad 7, and the pad 7 will completely close the water passage 81 in such a manner that the water fluids of container 6 won't flow into the insertion pillar 5, thereby allowing a stop supply of water fluids. Besides, as the storage of supplier, the plug 63 of container 6 can completely insert into the air inlet 62 so as to substantially close said air inlet 62, accordingly, the leak of water fluids can be avoidable. On the other hand, the user can hang this supplier on a hanging hook for storage, by using the hole 62 of the coupling piece 641 of container 6.

While we have shown and described various embodiments in accordance with the present invention, it should be clear to those skilled in the art that further embodiments may be made without departing from the scope of the present invention.

What is claimed is:

1. A fluid supplier adapted to potted plants comprising:
   an insertion pillar having at least one drainage aperture, and a pad having a central hole and a guide chute mounted at the top of the insertion pillar, wherein the central hole is in communication with the guide chute and the drainage aperture, respectively;
   a rotatable adjustment member fastened to the insertion pillar and at a predetermined position therein in operative association with the guide chute, forming a variable size water passage;
   a container having an air inlet assembled with said adjustment member;
   wherein a seat is disposed at the top of insertion pillar, and between the seat and the pad is formed a positioning structure for the position of pad; and
   wherein the positioning structure consists of at least one locating peg mounted on the seat of the insertion pillar, and a positioning bore in response to said at least one locating peg arranged in the pad.

2. The fluid supplier adapted to potted plants as claimed in claim 1, wherein a connection structure is provided between the adjustment member and the seat comprising a projected fastening ridge arranged at the inner periphery of the seat, and a concaved locking groove, defined at an outer periphery of a solid cylinder protruded from a bottom of the adjustment member adapted to matingly engage the projected fastening ridge.

* * * * *